United States Patent
Rajput et al.

(10) Patent No.: US 12,470,592 B2
(45) Date of Patent: Nov. 11, 2025

(54) METHODS, SYSTEMS, AND COMPUTER READABLE MEDIA FOR MITIGATING NETWORK SECURITY ATTACKS BY LINKING NETWORK FUNCTION (NF) DISCOVERY RESULTS WITH SUBSEQUENT MESSAGES AT PROXY NF

(71) Applicant: Oracle International Corporation, Redwood Shores, CA (US)

(72) Inventors: Jay Rajput, Bangalore (IN); Shashikiran Bhalachandra Mahalank, Bangalore (IN); Virendra Singh, Bangalore (IN); John Nirmal Mohan Raj, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 102 days.

(21) Appl. No.: 18/649,478

(22) Filed: Apr. 29, 2024

(65) Prior Publication Data
US 2025/0337770 A1   Oct. 30, 2025

(51) Int. Cl.
*H04L 9/40* (2022.01)
*H04L 67/51* (2022.01)
*H04W 84/04* (2009.01)

(52) U.S. Cl.
CPC ...... *H04L 63/1441* (2013.01); *H04L 63/0281* (2013.01); *H04L 67/51* (2022.05); *H04W 84/042* (2013.01)

(58) Field of Classification Search
CPC . H04L 63/1441; H04L 63/0281; H04L 67/51; H04W 84/042
See application file for complete search history.

(56) References Cited

U.S. PATENT DOCUMENTS

| | | | |
|---|---|---|---|
| 11,553,342 B2 | 1/2023 | Mahalank et al. | |
| 2014/0223537 A1* | 8/2014 | Islam | H04L 63/20 726/12 |
| 2021/0377054 A1* | 12/2021 | Mahajan | G06F 9/455 |

OTHER PUBLICATIONS

"3rd Generation Partnership Project; Technical Specification Group Core Network and Terminals; 5G System; Technical Realization of Service Based Architecture; Stage 3 (Release 18)", 3GPP TS 29.500, V18.5.0, pp. 1-150 (Mar. 2024).

(Continued)

*Primary Examiner* — Sm A Rahman
(74) *Attorney, Agent, or Firm* — Jenkins, Taylor & Hunt, P.A.

(57) ABSTRACT

A method for mitigating network security attacks by linking NF discovery results to subsequent messages includes receiving, at a proxy NF, NF discovery messages. The method further includes reading, by the proxy NF, producer NF and consumer-NF-identifying parameters from the NF discovery messages. The method further includes creating, by the proxy NF, records in an NF-discovery-linked security database maintained by the proxy NF, wherein the records include the consumer NF and producer-NF-identifying parameters read from the NF discovery messages. The method further includes receiving, by the proxy NF, a service-based interface (SBI) request message. The method further includes screening, by the proxy NF and using the records in the NF-discovery-linked security database, the SBI request message. The method further includes performing, by the proxy NF, a network security action for the SBI request message based on results of the screening.

18 Claims, 12 Drawing Sheets

(56) References Cited

OTHER PUBLICATIONS

"3rd Generation Partnership Project; Technical Specification Group Core Network and Terminals; 5G System; Network Function Repository Services; Stage 3 (Release 18)", 3GPP TS 29.510, V18.6.0, pp. 1412 (Mar. 2024).

"3rd Generation Partnership Project; Technical Specification Group Services and System Aspects; Security architecture and procedures for 5G system (Release 18)", 3GPP TS 33.501, V18.5.0, pp. 1-330 (Mar. 2024).

\* cited by examiner

METHODS, SYSTEMS, AND COMPUTER READABLE MEDIA FOR MITIGATING NETWORK SECURITY ATTACKS BY LINKING NETWORK FUNCTION (NF) DISCOVERY RESULTS WITH SUBSEQUENT MESSAGES AT PROXY NF

TECHNICAL FIELD

The subject matter described herein relates to providing enhanced network security. More particularly, the subject matter described herein relates to methods, systems, and computer readable media for mitigating security attacks by linking NF discovery results with subsequent messages at a proxy NF, such as a service communication proxy (SCP) or a security edge protection proxy (SEPP).

BACKGROUND

In 5G telecommunications networks, a network function that provides service is referred to as a producer NF or service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name (FQDN) that resolves to an IP address and port number on a network node that hosts a producer NF. An NF instance is an instance of a producer NF that provides one or more services. A given producer NF may include more than one NF instance. It should also be noted that multiple NF instances can share the same service endpoint.

NFs register with a network function repository function (NRF). The NRF maintains profiles of available NF instances identifying the services supported by each NF instance. The profile of an NF instance is referred to in 3GPP TS 29.510 as an NF profile. NF instances can obtain information about other NF instances that have registered with the NRF through the NF discovery service operation. According to the NF discovery service operation, a consumer NF sends an NF discovery request to the NRF. The NF discovery request includes query parameters that the NRF uses to locate the NF profiles of producer NFs capable of providing the service identified by the query parameters. NF profiles are data structures that define the types of services provided by an NF instance as well as contact and capacity information regarding the NF instance.

SCPs route messages between producer NF instances. An SCP can also invoke the NF discovery service operation to learn about available producer NF instances. The case where the SCP uses the NF discovery service operation to obtain information about producer NF instances on behalf of consumer NFs is referred to as delegated discovery. Consumer NFs connect to the SCP, and the SCP load balances traffic among producer NF service instances that provide the required services or directly routes the traffic to the destination producer NF instances.

One problem that can occur in 5G and subsequent generation networks is that attackers can initiate security attacks by sending fake service-based interface (SBI) request messages at the interface between a visited public land mobile network (VPLMN) and a home PLMN (HPLMN) or at the interface between a mobile network operator (MNO) network and a mobile virtual network operator (MVNO) network. Such attacks can be denial of service (DOS) attacks designed to overwhelm the resources of the receiving network functions, attacks designed to obtain subscriber information without authorization, or any other type of attack that uses fake SBI request messages. Because these attacks can lead to denial of service, unauthorized access to subscriber information, and other difficulties, there exists a need for improved methods, systems and computer readable media for screening SBI request messages at the interface between a VPLMN and an HPLMN and at the interface between an MNO network and an MVNO network.

SUMMARY

A method for mitigating network security attacks by linking network function (NF) discovery results to subsequent message includes receiving, at a proxy NF, NF discovery messages. The method further includes reading, by the proxy NF, consumer-NF-identifying parameters and producer-NF-identifying parameters from the NF discovery messages. The method further includes creating, by the proxy NF, records in an NF-discovery-linked security database maintained by the proxy NF, where the records include the consumer-NF-identifying parameters and the producer-NF-identifying parameters read from the NF discovery messages. The method further includes receiving, by the proxy NF, a service-based interface (SBI) request message. The method further includes screening, by the proxy NF and using the records in the NF-discovery-linked security database, the SBI request message. The method further includes performing, by the proxy NF, a network security action for the SBI request message based on results of the screening.

According to another aspect of the subject matter described herein, the proxy NF comprises a security edge protection proxy (SEPP).

According to another aspect of the subject matter described herein, receiving the NF discovery messages includes receiving inter-public land mobile network (PLMN) NF discovery messages.

According to another aspect of the subject matter described herein, the proxy NF comprises a service communication proxy (SCP).

According to another aspect of the subject matter described herein, receiving the NF discovery messages are transmitted between a mobile network operator (MNO) network and a mobile virtual network operator (MVNO) network.

According to another aspect of the subject matter described herein, reading, by the proxy NF, consumer-NF-identifying parameters and producer-NF-identifying parameters from the NF discovery messages includes reading a consumer NF instance identifier (Id) from an NF discovery request message and at least one producer NF instance Id from discovery results in an NF discovery response message.

According to another aspect of the subject matter described herein, creating the records includes creating a record that contains the consumer NF instance Id and the at least one producer NF instance Id.

According to another aspect of the subject matter described herein, screening the SBI request message includes reading, from the SBI request message, a consumer-NF-identifying parameter and a producer-NF-identifying parameter, and determining whether the NF-discovery-linked security database includes a record that contains the consumer-NF-identifying parameter and the producer-NF-identifying parameter read from the SBI request message.

According to another aspect of the subject matter described herein, performing the network security action includes, when the NF-discovery-linked security database includes a record that contains the consumer-NF-identifying parameter and the producer-NF-identifying parameter read from the SBI request message, forwarding the SBI request message to a producer NF.

According to another aspect of the subject matter described herein, performing the network security action includes, when the NF-discovery-linked security database does not include a record that contains the consumer-NF-identifying parameter and the producer-NF-identifying parameter read from the SBI request message, blocking the SBI request message.

According to another aspect of the subject matter described herein, a system for mitigating network security attacks by linking network function (NF) discovery results to subsequent messages, the system includes a proxy NF including at least one processor and a memory. The system further includes an NF-discovery-linked security manager executable by the at least one processor for receiving NF discovery messages, reading consumer-NF-identifying parameters and producer-NF-identifying parameters from the NF discovery messages, creating records in an NF-discovery-linked security database stored in the memory, where the records include the consumer-NF-identifying parameters and the producer-NF-identifying parameters read from the NF discovery messages, the NF-discovery-linked security manager for receiving a service-based interface (SBI) request message, screening, using the records in the NF-discovery-linked security database, the SBI request message, and performing a network security action for the SBI request message based on results of the screening.

According to another aspect of the subject matter described herein, in screening the SBI request message, the NF-discovery-linked security manager is configured to read, from the SBI request message, a consumer-NF-identifying parameter and a producer-NF-identifying parameter and determine whether the NF-discovery-linked security database includes a record that contains the consumer-NF-identifying parameter and the producer-NF-identifying parameter in the SBI request message.

According to another aspect of the subject matter described herein, in performing the network security action, the NF-discovery-linked security manager is configured to, when the NF-discovery-linked security database includes a record that contains the consumer-NF-identifying parameter and the producer-NF-identifying parameter read from the SBI request message, forward the SBI request message to a producer NF.

According to another aspect of the subject matter described herein, in performing the network security action, the NF-discovery-linked security manager is configured to, when the NF-discovery-linked security database does not include a record that contains the consumer-NF-identifying parameter and the producer-NF-identifying parameter read from the SBI request message, block the SBI request message.

According to another aspect of the subject matter described herein, a non-transitory computer readable medium having stored thereon executable instructions that when executed by a processor of a computer control the computer to perform steps is provided. The steps include receiving, at a proxy network function (NF), NF discovery messages. The steps further include reading, by the proxy NF, producer NF and consumer-NF-identifying parameters from the NF discovery messages. The steps further include creating, by the proxy NF, records in an NF-discovery-linked security database maintained by the proxy NF, where the records include the consumer NF and producer-NF-identifying parameters read from the NF discovery messages. The steps further include receiving, by the proxy NF, a service-based interface (SBI) request message. The steps further include screening, by the proxy NF and using the records in the NF-discovery-linked security database, the SBI request message. The steps further include performing, by the proxy NF, a network security action for the SBI request message based on results of the screening.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
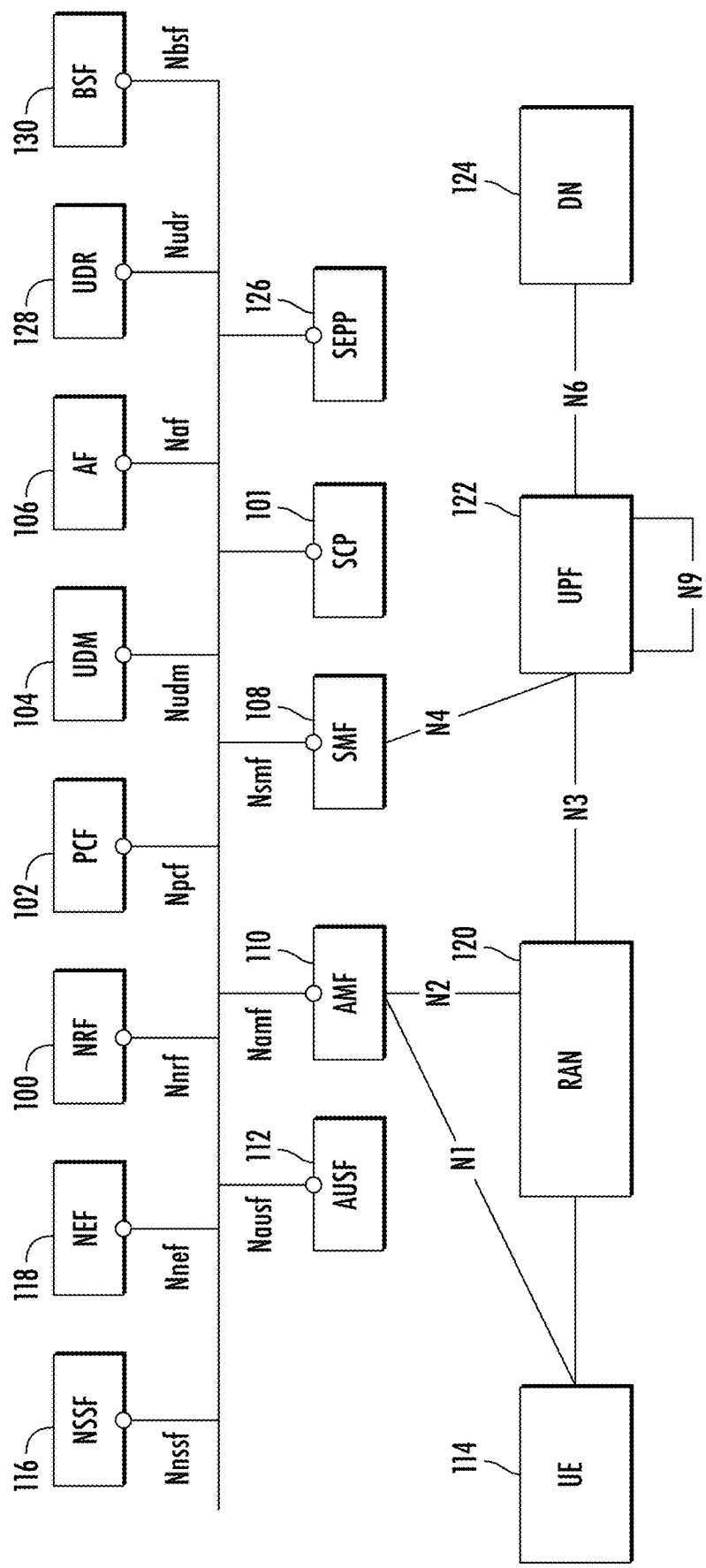
FIG. 1 is a network diagram illustrating an exemplary 5G system network architecture.

FIG. 1 is a network diagram illustrating an exemplary 5G system network architecture. The architecture in FIG. 1 includes NRF 100 and SCP 101, which may be located in the same home public land mobile network (HPLMN). As described above, NRF 100 may maintain profiles of available NF instances and their supported services and allow consumer NFs or SCPs to subscribe to and be notified of the registration of new/updated NF instances. SCP 101 may also support service discovery and selection of NF instances. SCP 101 may perform load balancing of connections between consumer and producer NFs.

NRF 100 is a repository for profiles of NF instances. To communicate with a producer NF instance, a consumer NF or an SCP must obtain the NF profile of the producer NF instance from NRF 100. The NF profile is a JavaScript object notation (JSON) data structure defined in 3GPP TS 29.510. The NF profile includes attributes that indicate the types of services provided, capacity of the NF instance, and information for contacting the NF instance.

In FIG. 1, any of the network functions can be consumer NFs, producer NFs, or both, depending on whether they are requesting, providing, or requesting and providing services. In the illustrated example, the NFs include a policy control function (PCF) 102 that performs policy related operations in a network, a unified data management function (UDM) 104 that manages user data, and an application function (AF) 106 that provides application services.

The NFs illustrated in FIG. 1 further include a session management function (SMF) 108 that manages sessions between an access and mobility management function (AMF) 110 and PCF 102. AMF 110 performs mobility management operations similar to those performed by a mobility management entity (MME) in 4G networks. An authentication server function (AUSF) 112 provides authentication services for user equipment (UEs), such as user equipment (UE) 114, seeking access to the network.

A network slice selection function (NSSF) 116 provides network slicing services for devices seeking to access specific network capabilities and characteristics associated with a network slice. NSSF 116 provides the NSSelection service, which allows NFs to request information about network slices and the NSSAIReachability service, which enables NFs to update and subscribe to receive notification of updates in network slice selection assistance information (NSSAI) reachability information.

A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a gNB (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

A SEPP 126 filters incoming traffic from another PLMN and can perform topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN. A SEPP filtering egress messages from consumer NFs in a PLMN is referred to as a consumer SEPP or C-SEPP. A SEPP that filters ingress messages directed to consumer NFs in a PLMN is referred to as a producer SEPP or P-SEPP. A given SEPP can function as a C-SEPP and a P-SEPP, depending on the role the SEPP is performing.

A unified data repository (UDR) 128 stores subscription data for UEs. A binding support function (BSF) 130 manages bindings between PDU sessions and PCFs.

As described above, one problem that can occur in 5G and subsequent generation networks is that hackers can send fake SBI request messages into a network as part of a DOS attack, an attempt to steal subscriber data, or as part of any type of attack that involves fake or unauthorized SBI request messages. Existing security measures in and between networks need to be improved to more adequately screen SBI request messages and mitigate these types of attacks.

A SEPP enables inter-PLMN communication of SBI roaming signaling between a visited PLMN and a home PLMN. In one example, the subject matter described herein includes a security countermeasure at an HPLMN SEPP (also referred to as a P-SEPP) to mitigate security attacks initiated through spoofing of visited PLMN NF signaling. The security countermeasure includes performing cross correlation of an SBI service request received from a (fake) VPLMN consumer network function against previously received successful NRF discovery request used to discover a corresponding producer NF/NF service instance of the HPLMN. NF discovery is used for linking with subsequent messages, as the H-NRF authenticates/authorizes the NF discovery based on operator policies for inter-PLMN messages. By linking NF discovery with subsequent messages, the H-SEPP implements screening to determine that the SBI request was originated by an authenticated/authorized consumer NF.

A SEPP enables inter-PLMN communication of roaming SBI signaling between the VPLMN and HPLMN in 5G networks. A VPLMN consumer NF instance who wants to consume HPLMN producer NF service performs NF discovery of producer NF service instance of HPLMN using NRF discovery requests from V-NRF to H-NRF via VPLMN and HPLMN SEPP NFs. After discovery of HPLMN producer NF service instance/s, the VPLMN consumer NF instance sends the service request to discovered HPLMN producer service instance via VPLMN and HPLMN SEPP NFS.

Figure 2:
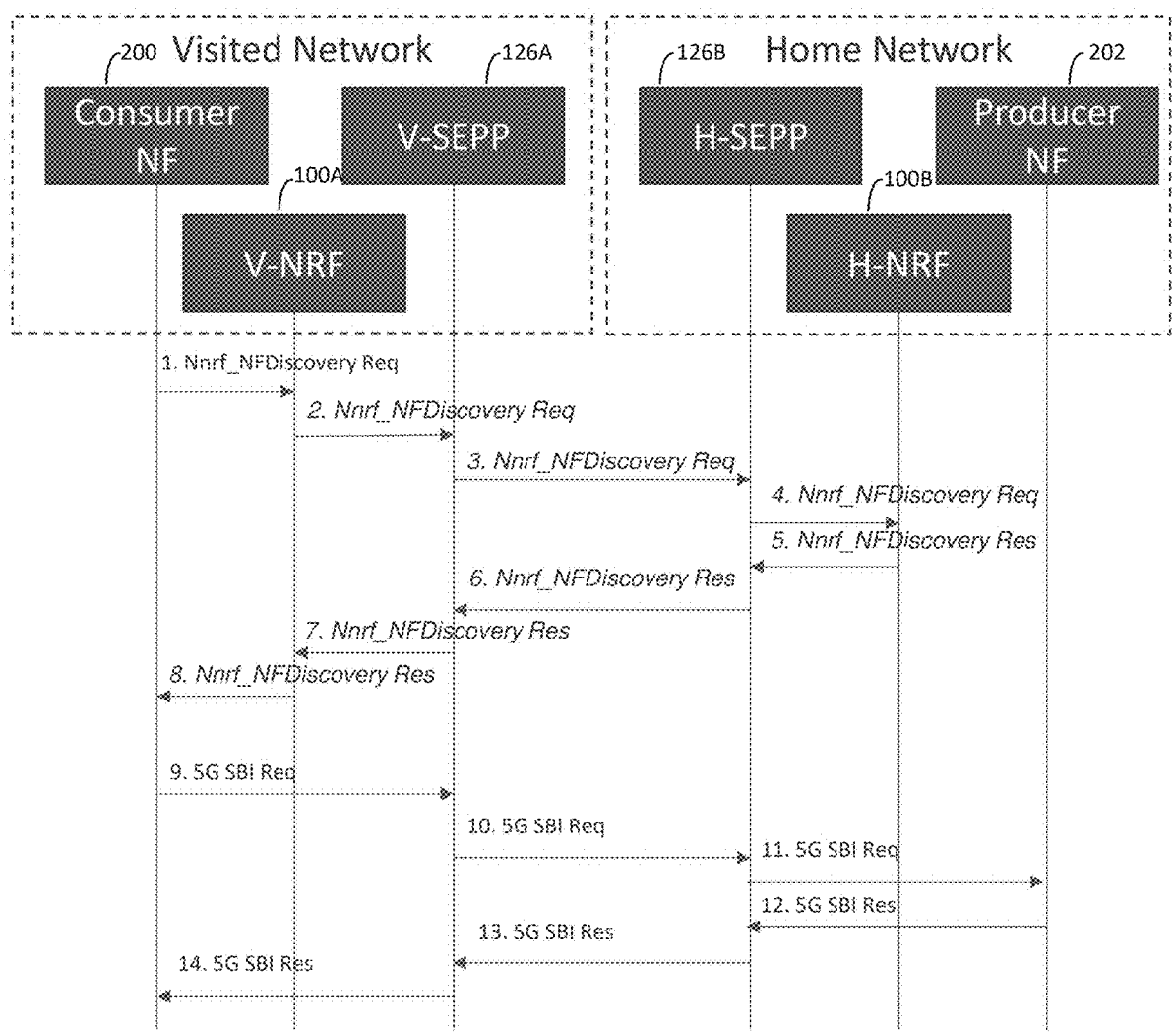
FIG. 2 is a message flow diagram illustrating exemplary messages exchanged between a VPLMN and an HPLMN for NF discovery and a subsequent service request.

FIG. 2 is a message flow diagram illustrating exemplary messages exchanged between a VPLMN and an HPLMN for NF discovery and a subsequent service request. Referring to FIG. 2, in step 1, a consumer NF 200 initiates an NF discovery request to V-NRF 100A. In step 2, V-NRF 100A forwards the NF discovery request to V-SEPP 126A. In step 3, V-SEPP 126A forwards the NF discovery request to H-SEPP 126B. In step 4, H-SEPP 126B forwards the NF discovery request to H-NRF 100B. In step 5, H-NRF 100B generates an NF discovery response and forwards the NF discovery response to H-SEPP 126B. In step 6, H-SEPP 126B forwards the NF discovery response to V-SEPP 126A. In step 7, V-SEPP 126A forwards the NF discovery response to V-NRF 100A. In step 8, V-NRF 100A forwards the NF discovery response to consumer NF 200.

Upon receiving the NF discovery response, consumer NF 200 performs NF selection among the NF profiles received in the NF discovery response. In step 9, consumer NF 200 initiates an SBI request directed to producer NF 202 and forwards the SBI request to V-SEPP 126A. In step 10, V-SEPP 126A sends the SBI request to H-SEPP 126B. In step 11, H-SEPP 126B sends the SBI request to producer NF 202. Producer NF 202 generates an SBI response and, in step 12, producer NF 202 forwards the SBI response to H-SEPP 126B.

In step 13, H-SEPP 126B forwards the SBI response to V-SEPP 126A. In step 14, V-SEPP 126A forwards the SBI response to consumer NF 200. It should be noted that without sufficient validation or verification, the SBI request in step 9 could be used for attack purposes.

In general, security attacks can be initiated through the interconnect between a VPLMN and an HPLMN by attackers masquerading as consumer NFs and sending fake inter-PLMN roaming signaling messages towards producer NFs of remote PLMN networks of mobile network operators (MNOs). Attackers may be able to send such messages due to compromises of interconnect networks between VPLMNs and HPLMNs for inter-PLMN routing models of roaming signaling. One instance in which a compromise of the interconnect can occur is when SEPPs are outsourced to IP exchange (IPX) providers. There is no end-to-end confidentiality and integrity protection of inter-PLMN signaling between PLMNs. Another instance in which a compromise of the interconnect network can occur is when MNOs connect to IPX providers with hosted SEPP models to support roaming value added services (VAS). In this situation as well, there is no end to end confidentiality and integrity protection of roaming signaling between PLMNs. Here, IPX providers host intermediate SEPPs between PLMN SEPPs to provide roaming signaling connectivity and roaming VAS. The spoofed consumer NFs in these cases can initiate DOS attacks by sending a flood of inter-PLMN signaling towards producer NF instances, leading to service outages and overloading of the producer NF instances. The spoofed consumer NFs can also retrieve critical subscriber information, such as subscriber identities and locations, which can be used to initiate fraud attacks.

Figure 3:
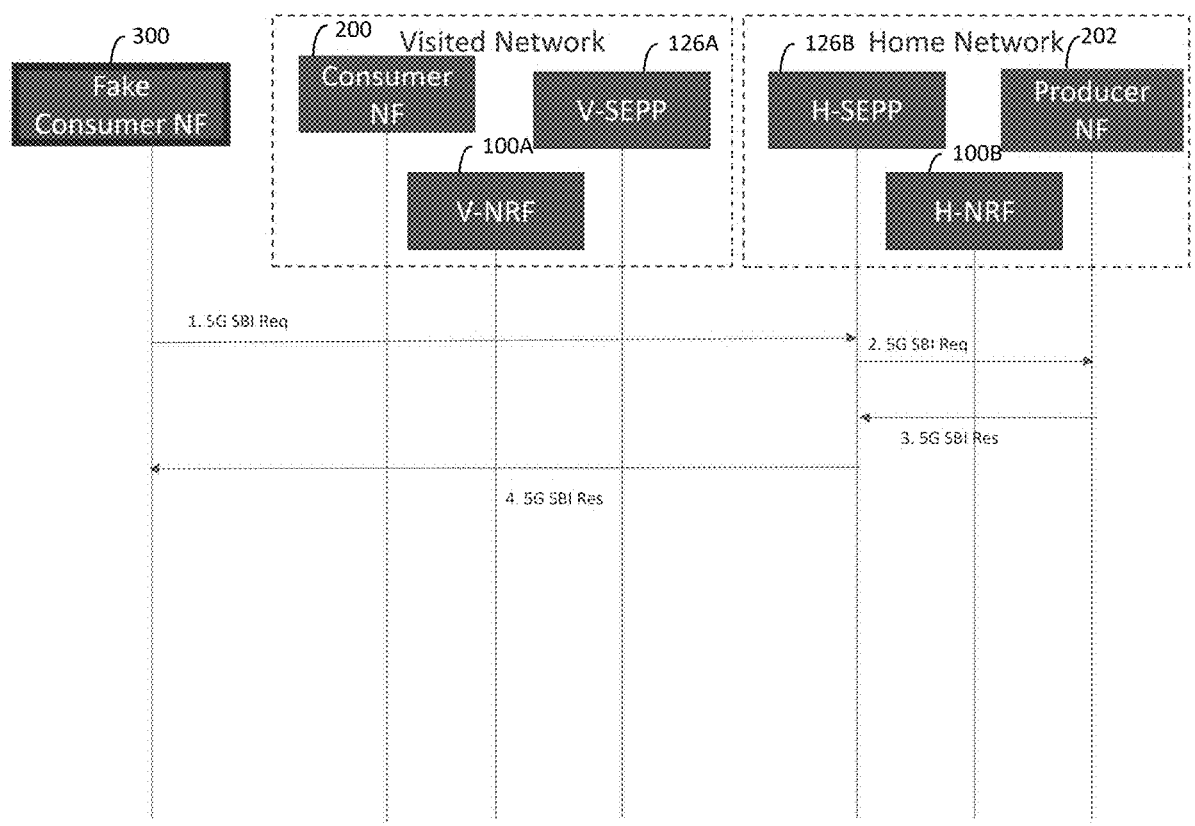
FIG. 3 is a message flow diagram illustrating a fake consumer NF sending an attack SBI request message into an HPLMN.

FIG. 3 is a message flow diagram illustrating a fake consumer NF sending an attack SBI request message into an HPLMN. Referring to FIG. 3, in step 1, a fake consumer NF 300 generates an attack SBI request message directed to producer NF 202 and sends the attack SBI request message to the home network through V-SEPP 126A and H-SEPP 126B, neither of which blocks the message. In step 2, H-SEPP 126B forwards the fake SBI request message to producer NF 202. In step 3, producer NF 202 generates an SBI response and sends the response to H-SEPP 126B. In step 4, H-SEPP 126B sends the SBI response to fake consumer NF 300.

In FIG. 3, neither V-SEPP 126A nor H-SEPP 126B screened the attack SBI request message, and, as a result, the message was allowed to reach its intended target. The attack SBI request message could be part of a DOS attack intended to overwhelm the processing resources of producer NF 202 or part of a subscriber-level fraud attack intended to steal subscriber information, such as a subscriber ID, location, etc., from producer NF 202.

To reduce the likelihood of successful inter-PLMN DoS and subscriber-level fraud attacks, the H-SEPP may implement a security countermeasure by correlating information from NF discovery requests with service requests from consumer NFs of a VPLMN. The H-SEPP may record successful NF discovery service information for each of the NF discovery requests from VPLMN consumer NFs. Successful NF discovery results are obtained when a consumer NF is authenticated/authorized by the H-NRF based on network operator policies. The H-SEPP may maintain, for each successful NF discovery request from a consumer NF in a VPLMN, a database record with the NRF discovery information listed below:
  the VPLMN Id of the VPLMN consumer NF (requester PLMN Id);
  the VPLMN consumer NF type and NF instance Id; and
  discovered HPLMN producer NF/NF service instances IDs.

When a consumer NF of a VPLMN Id sends the service request towards an HPLMN producer NF instance, the H-SEPP may check to determine whether the NF-discovery-linked security database includes a record with a matching producer NF/NF service instance Id and matching VPLMN Ids and VPLMN consumer NF Ids. If a matching record is found, then the H-SEPP may forward the service request towards the producer NF of the HPLMN. If the H-SEPP does not locate a matching record, the H-SEPP may drop or reject the service request from the VPLMN consumer NF. Future service requests initiated by a consumer NF that sent a fake SBI request may be blocked at the H-SEPP.

Figure 4:
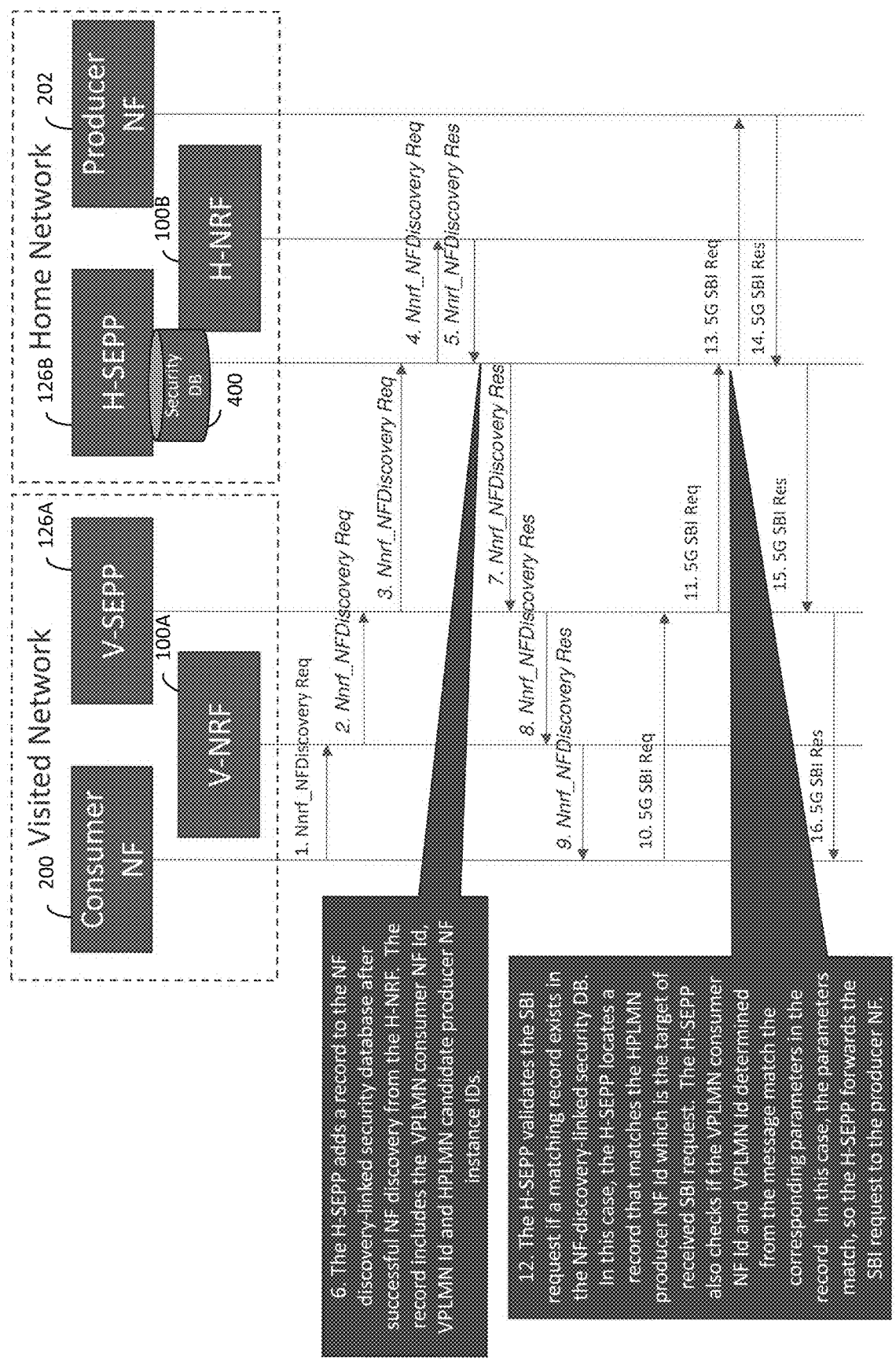
FIG. 4 is a message flow diagram illustrating the use of NF discovery results by a SEPP to screen an SBI request message where the message passes NF-discovery-linked security screening.

FIG. 4 is a message flow diagram illustrating the use of NF discovery results by a SEPP to screen an SBI request message where the message passes NF-discovery-linked security screening. Referring to FIG. 4, in step 1, a consumer NF 200 initiates an NF discovery request to V-NRF 100A. In step 2, V-NRF 100A forwards the NF discovery request to V-SEPP 126A. In step 3, V-SEPP 126A forwards the NF discovery request to H-SEPP 126B. In step 4, H-SEPP 126B forwards the NF discovery request to H-NRF 100B. In step 5, H-NRF 100B generates an NF discovery response and forwards the NF discovery response to H-SEPP 126B. In step 6, H-SEPP 126B creates a record in NF-discovery-linked security database 400 based on the successful NF discovery results. The record includes the consumer NF instance Id of VPLMN consumer NF 200, the VPLMN Id of the VPLMN where consumer NF 200 resides, and the HPLMN producer NF instance Ids returned in the NF discovery response.

In step 7, H-SEPP 126B forwards the NF discovery response to V-SEPP 126A. In step 8, V-SEPP 126A forwards the NF discovery response to V-NRF 100A. In step 9, V-NRF 100A forwards the NF discovery response to consumer NF 200.

Upon receiving the NF discovery response, consumer NF 200 performs NF selection among the NF profiles received in the NF discovery response. In step 10, consumer NF 200 initiates an SBI request directed to producer NF 202 and forwards the SBI request to V-SEPP 126A. In step 11, V-SEPP 126A sends the SBI request to H-SEPP 126B. In step 12, H-SEPP 126B validates the SBI request be performing a lookup in NF-discovery-linked security database 400 using the NF instance Id of consumer NF 200 obtained from the SBI request message. If H-SEPP 126B locates a database record with a matching consumer NF instance Id, H-SEPP 126B checks the consumer PLMN Id. If the matching record includes a consumer PLMN Id that matches the consumer PLMN Id determined from the SBI request message, H-SEPP 126B determines whether the record includes a producer NF instance Id that matches the target producer NF instance Id from the SBI request message. If H-SEPP 126B determines that the database record includes a producer NF instance Id that matches the target NF instance Id from the message, H-SEPP 126B determines that the message passes the NF-discovery-linked security screening, and, in step 13, H-SEPP 126B sends the SBI request to producer NF 202. Producer NF 202 generates an SBI response and, in step 14, producer NF 202 forwards the SBI response to H-SEPP 126B. In step 15, H-SEPP 126B forwards the SBI response to V-SEPP 126A. In step 16, V-SEPP 126A forwards the SBI response to consumer NF 200.

Figure 5:
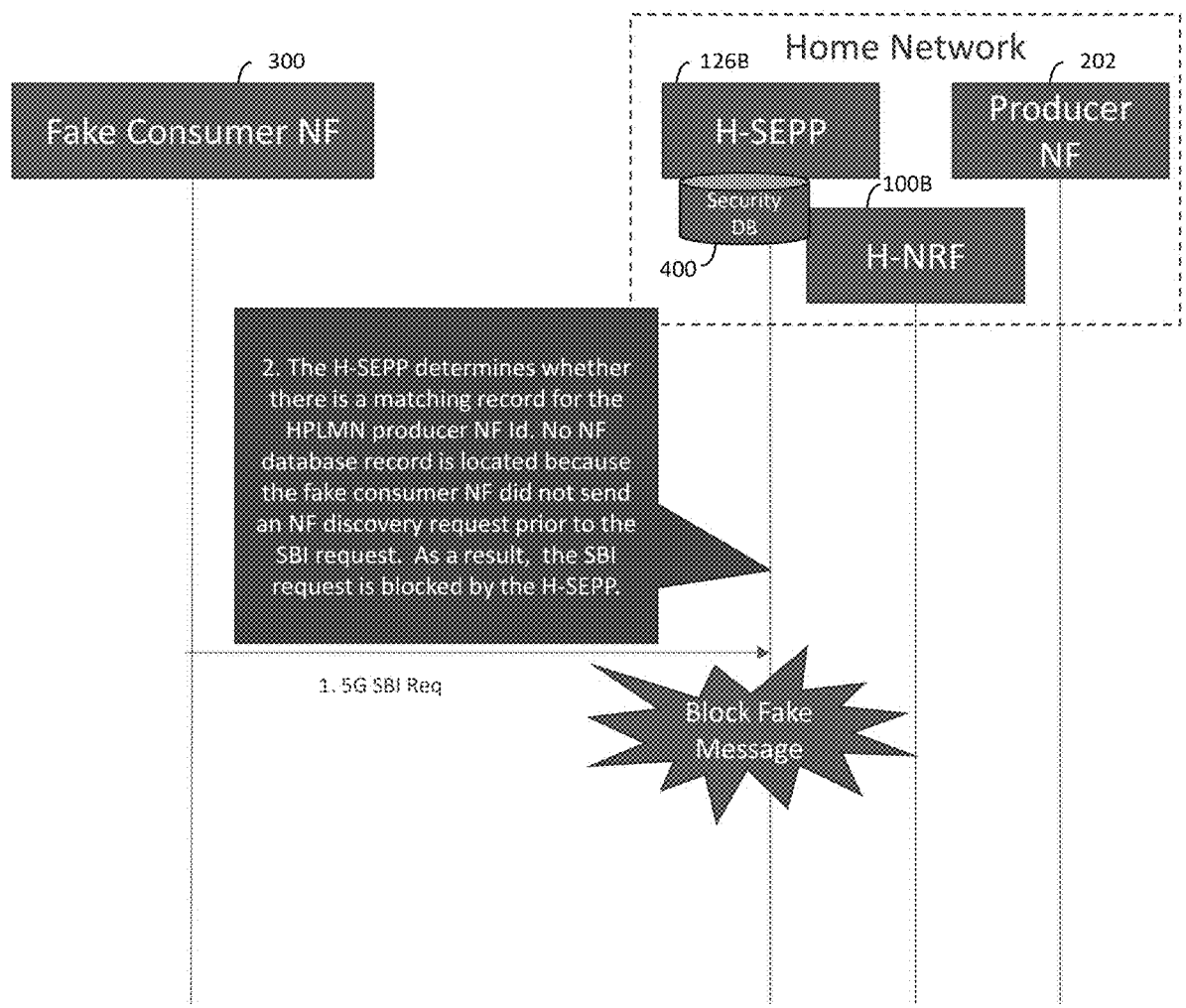
FIG. 5 is a message flow diagram illustrating the use of NF discovery results by a SEPP to screen an SBI request message where the message fails NF-discovery-linked security screening.

FIG. 5 is a message flow diagram illustrating the use of NF discovery results by a SEPP to screen an SBI request message where the message fails NF-discovery-linked security screening. Referring to FIG. 5, in step 1, fake consumer NF 300 sends a fake SBI request message to a home network. In step 2, H-SEPP 126B receives the fake SBI request message and performs NF-discovery-linked security screening for the message. In this case, H-SEPP 126B does not locate a matching record in NF-discovery-linked security database 400. Accordingly, H-SEPP 126B performs a network security action, such as blocking the fake SBI request message.

The subject matter described herein is not limited to performing NF-discovery-linked security screening at a SEPP. In an alternate implementation, NF-discovery-linked security screening can be performed at an SCP. The SCP of the 5G core network enables inter-PLMN communication of 5G SBI signaling between a mobile network operator (MNO) core network and a mobile virtual network operator (MVNO) core network. The subject matter described herein includes a security countermeasure at the MVNO-SCP to mitigate security attacks initiated through spoofing of MNO PLMN NF signaling. The security countermeasure includes performing cross correlation of SBI service requests received from a real or fake MNO PLMN consumer network function against previously received successful NRF discovery results used to discover a producer NF/NF service instance of the MVNO PLMN. NF discovery is used for linking as the MVNO-NRF authenticates/authorizes the NF discovery based on operator policies for 5G SBI messages. By linking NF discovery with subsequent messages, the MVNO-SCP ensures that the subsequent messages were originated by an authenticated/authorized consumer NF.

One SBI message header that can be used to generate an NF-discovery-linked database record is the 3gpp-Sbi-Client-Credentials assertion (CCA) header by a consumer NF. 3GPP TS 33.501, Section 13.3.1.2 specifies the usage of the CCA header for the consumer NF authentication and authorization. The CCA header contains the consumer NF details, such as the consumer NF instance Id. All the messages in indirect communication mode are expected to have CCA header for client authentication.

Figure 6:
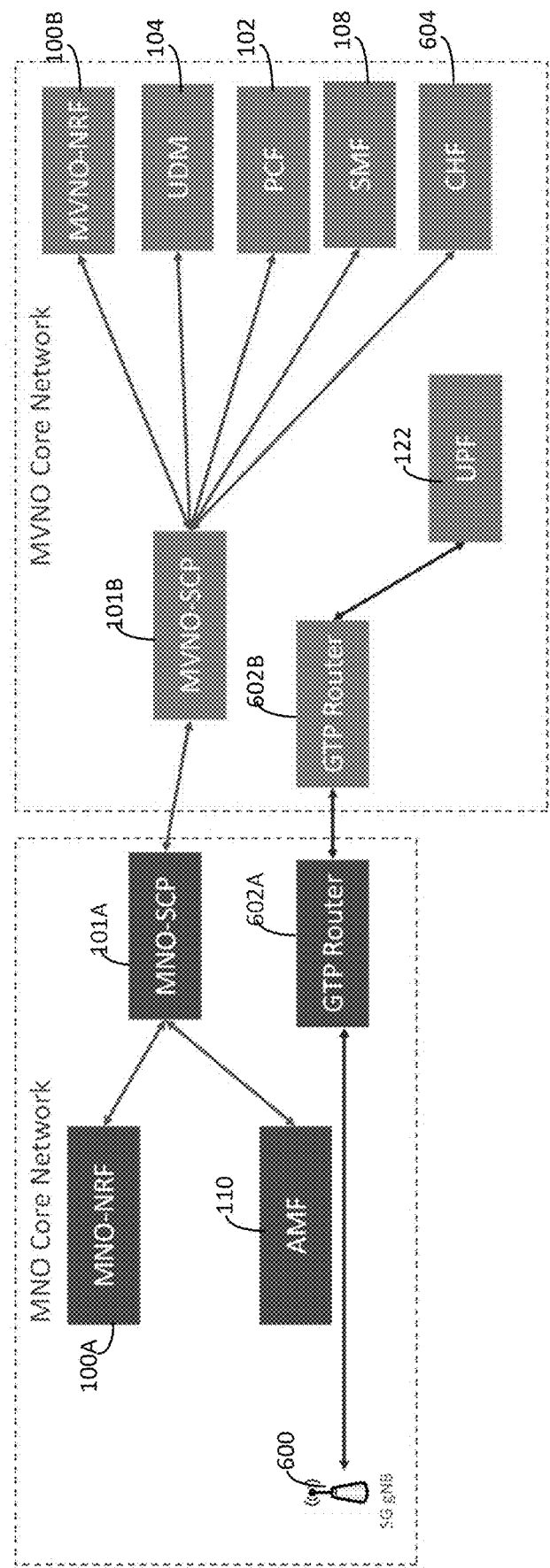
FIG. 6 is a network diagram illustrating a network architecture including an MNO network and an MVNO network.

FIG. 6 is a network diagram illustrating a network architecture including an MNO core network and an MVNO core network. Referring to FIG. 6, the MNO core network includes a gNB 600 and a general packet radio service (GPRS) tunneling protocol (GTP) router 602. The MNO core network further includes AMF 110, MNO-NRF 100A, and MNO-SCP 101A. The MVNO core network includes GTP router 602B and UPF 122. The MVNO core network further includes MVNO-NRF 100B, UDM 104, PCF 102, SMF 108, and charging function (CHF) 604.

In the architecture illustrated in FIG. 6, a consumer NF, such as AMF 110 of the MNO network, may send an NF discovery request to MVNO-NRF 100A. MVNO-NRF 100A may forward the NF discovery request to MNO-SCP 101A, which routes the message to MVNO-SCP 101B. MVNO-SCP 101B routes the NF discovery request to MVNO-NRF 100B. MVNO-NRF 100B responds to the NF discovery request with the NF and/or service profiles of the MVNO network's producer NF service instances and sends the response to AMF 110 of the MNO network. The consumer NF (AMF) is also authenticated/authorized based on operator policies as part of processing NF discovery request. After receiving the NF discovery results, AMF 110 sends a 5G SBI request to a producer NF service of MVNO via MVNO-SCP 101B. A similar message flow occurs when a consumer NF exists in the MVNO Network and a producer NF exists in the MNO network.

Figure 7:
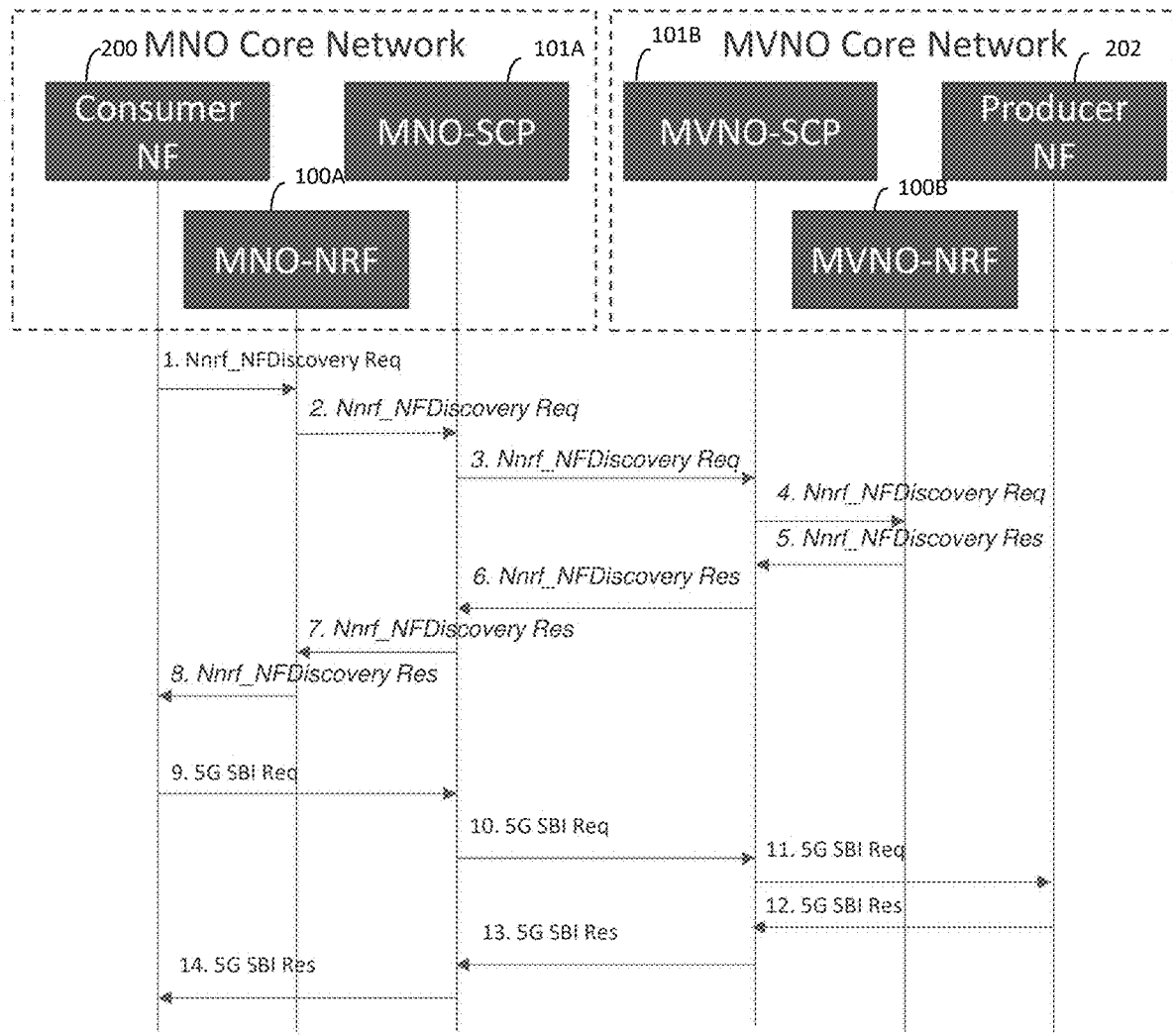
FIG. 7 is a message flow diagram illustrating exemplary messages exchanged between an MNO network and an MVNO network for NF discovery and a subsequent service request.

FIG. 7 is a message flow diagram illustrating exemplary messages exchanged between an MNO network and an MVNO network for NF discovery and a subsequent service request. Referring to FIG. 7, in step 1, a consumer NF 200 initiates an NF discovery request to MNO-NRF 100A. In step 2, MNO-NRF 100A forwards the NF discovery request to MNO-SCP 101A. In step 3, MNO-SCP 101A forwards the NF discovery request to MVNO-SCP 101B. In step 4, MVNO-SCP 101B forwards the NF discovery request to MVNO-NRF 100B. In step 5, MVNO-NRF 100B generates an NF discovery response and forwards the NF discovery response to MVNO-SCP 101B. In step 6, MVNO-SCP 101B forwards the NF discovery response to MNO-SCP 101A. In step 7, MNO-SCP 101A forwards the NF discovery response to MNO-NRF 100A. In step 8, MNO-NRF 100A forwards the NF discovery response to consumer NF 200.

Upon receiving the NF discovery response, consumer NF 200 performs NF selection among the NF profiles received in the NF discovery response. In step 9, consumer NF 200 initiates an SBI request directed to producer NF 202 and forwards the SBI request to MNO-SCP 101A. In step 10, MNO-SCP 101A sends the SBI request to MVNO-SCP 101B. In step 11, MVNO-SCP 101B sends the SBI request to producer NF 202. Producer NF 202 generates an SBI response and, in step 12, producer NF 202 forwards the SBI response to MVNO-SCP 101B. In step 13, MVNO-SCP 101B forwards the SBI response to MNO-SCP 101A. In step 14, MNO-SCP 101A forwards the SBI response to consumer NF 200. It should be noted that without sufficient validation or verification, the SBI request in step 9 could be used for attack purposes.

As with the case for security attacks at the interconnection between the HPLMN and the VPLMN, security attacks can be initiated through the interconnect between MNO and MVNO core networks by spoofing consumer NF identities by attackers who send fake 5G SBI signaling messages towards MVNO network producer NFs from the MNO network. These attacks can occur due to compromises of signaling networks between the MNO network and the MVNO network for MNO↔MVNO routing models of 5G SBI signaling. The spoofed consumer NFs in these cases can initiate DOS attacks by sending a flood of 5G SBI signaling towards producer NF instances, leading to service outages and overloading of producer NF instances. The spoofed consumer NFs can also retrieve critical subscriber information, such as location, and may use the information to initiate fraud attacks.

Figure 8:
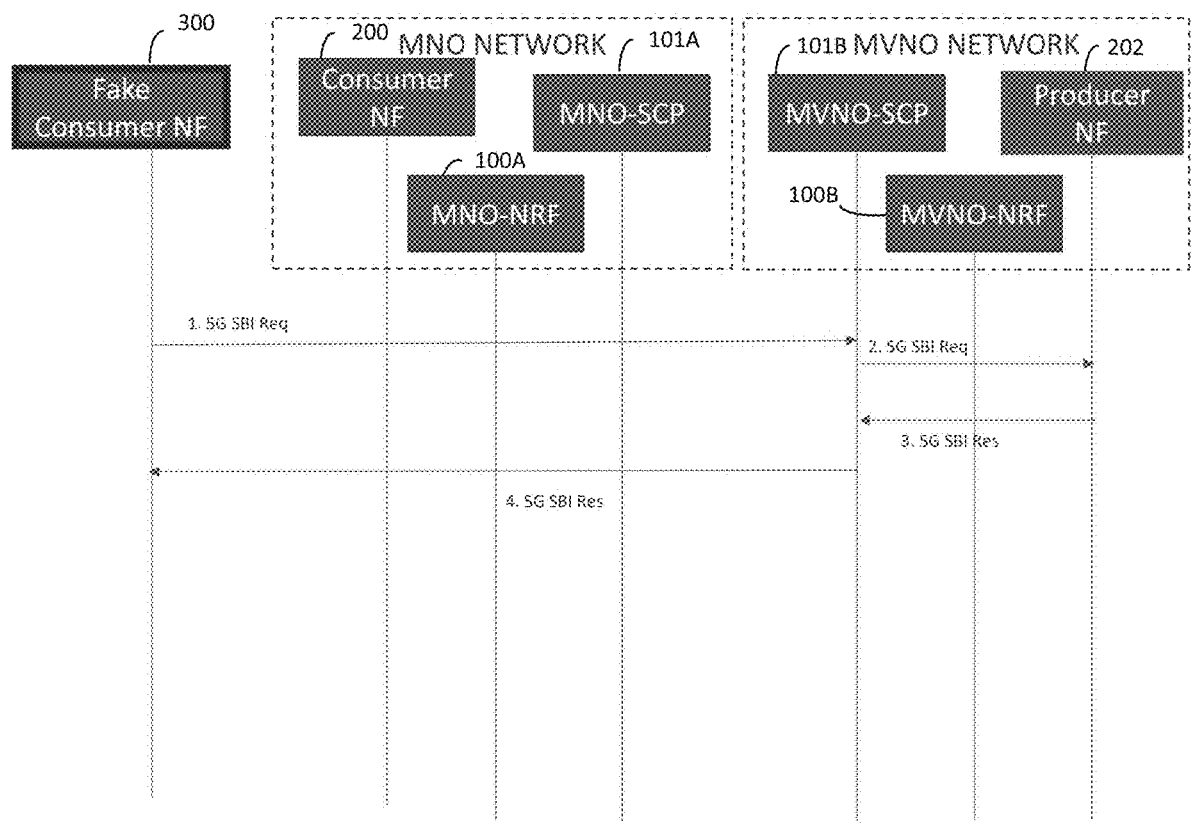
FIG. 8 is a message flow diagram illustrating a fake consumer NF initiating an attack on an MVNO network using a fake SBI request message.

FIG. 8 is a message flow diagram illustrating a fake consumer NF initiating an attack on an MVNO network using a fake SBI request message. Referring to FIG. 8, in step 1, fake consumer NF 300 sends a fake SBI request message to the MVNO network. The fake SBI request message may be sent via MNO SCP 101A to MVNO-SCP 101B. In step 2, MVNO-SCP 101B sends the fake SBI request message to producer NF 202. In step 3, producer NF 202 receives the fake SBI request message, generates a response, and sends the response to MVNO-SCP 101B. In step 4, MVNO-SCP 101B sends the response to fake consumer NF 300. The fake SBI request message may be part of a DOS attack or an attack designed to steal subscriber information.

To reduce the likelihood of successful security attacks on an MVNO network, the MVNO-SCP may implement NF-discovery-linked security screening of SBI service request messages directed to producer NFs in the MVNO network. The MVNO-SCP may record results of successful NF discovery service information for each of the NF discovery requests from MNO network consumer NFs. Successful NF discovery refers to NF discovery operations where the consumer is authenticated/authorized by MVNO-NRF based on operator policies. The MVNO-SCP may create a record in the NF-discovery-linked security database that links NF discovery consumer identification information with producer NF identification information obtained from the NF discovery results. The following is an example of information that may be included in an NF-discovery-linked security database record for screening messages between an MNO network and a MVNO network:

the MNO network's PLMN ID;
consumer NF instance details extracted from CCA headers, etc., received with the NF discovery request; and
discovered MVNO PLMN producer NF/NF service details from the NF discovery response.

When a consumer NF of the MNO network's PLMN Id sends a service request towards a producer NF instance in the MVNO network, the MVNO-SCP determines whether a record corresponding to the consumer and producer NF details in the service request exists in the NF-discovery-linked security database. If a matching record is found, then the MVNO-SCP may forward the service request towards the producer NF of the MVNO PLMN. If a matching record is not found, the MVNO-SCP may drop or reject the service request from MNO network consumer NF. Subsequent service requests from the same consumer NF for which the NF-discovery-linked security screening failed may also be blocked.

Figure 9:
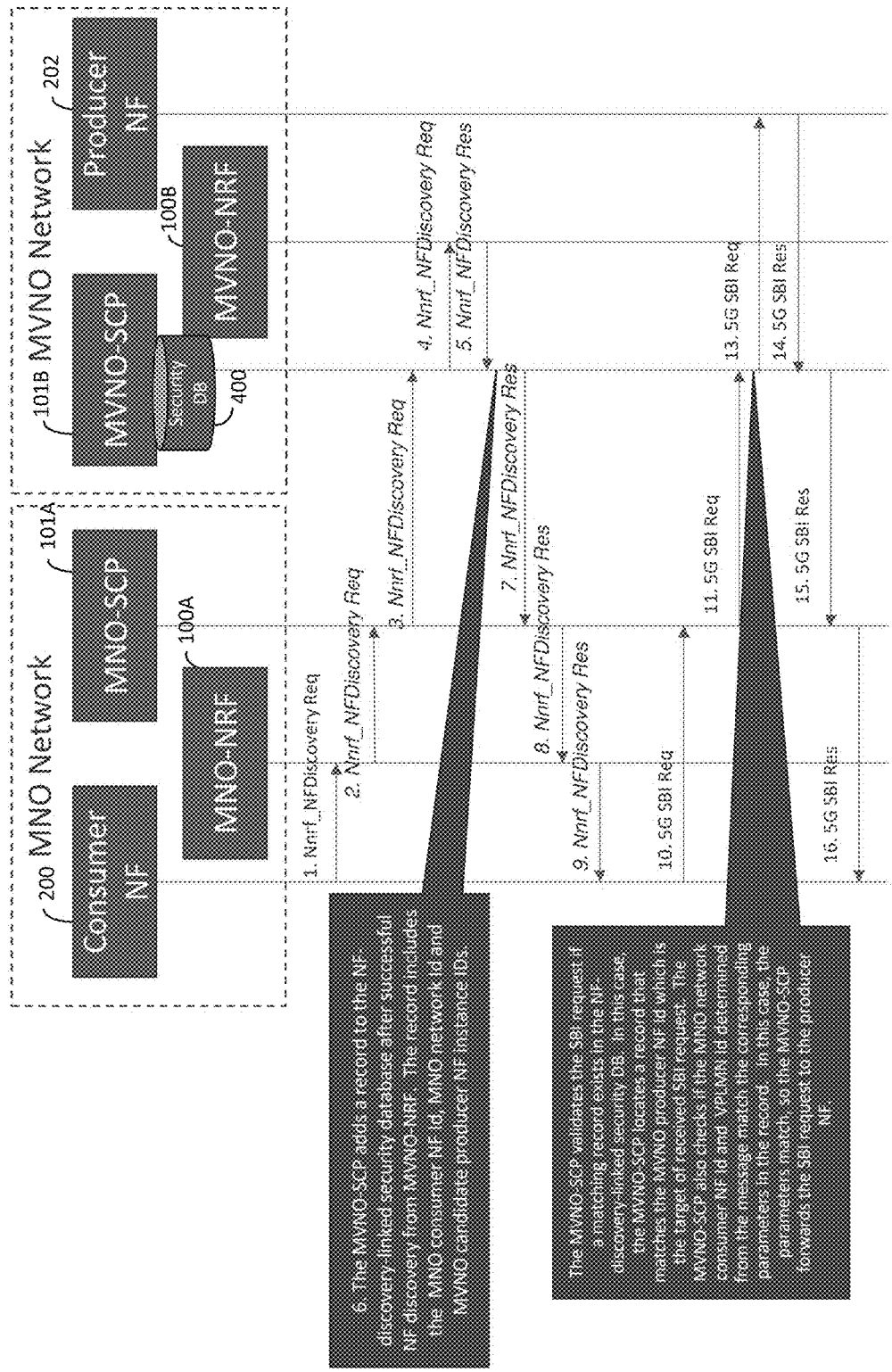
FIG. 9 is a message flow diagram illustrating the use of NF discovery results by an SCP to screen an SBI request message where the message passes NF-discovery-linked security screening.

FIG. 9 is a message flow diagram illustrating the use of NF discovery results by an SCP to screen an SBI request message where the message passes NF-discovery-linked security screening. Referring to FIG. 9, in step 1, a consumer NF 200 initiates an NF discovery request to MNO-NRF 100A. In step 2, MNO-NRF 100A forwards the NF discovery request to MNO-SCP 101A. In step 3, MNO-SCP 101A forwards the NF discovery request to MVNO-SCP 101B. In step 4, MVNO-SCP 101B forwards the NF discovery request to MVNO-NRF 100B. In step 5, MVNO-NRF 100B generates an NF discovery response and forwards the NF discovery response to MVNO-SCP 101B. In step 6, MVNO-SCP 101B creates a record in NF-discovery-linked security database 400 based on the successful NF discovery results. The record includes the consumer NF Id of MNO consumer NF 200, the network Id of the MNO network where consumer NF 200 resides, and the MVNO producer NF instance Ids returned in the NF discovery response.

In step 7, MVNO-SCP 101B forwards the NF discovery response to MNO-SCP 101A. In step 8, MNO-SCP 101A forwards the NF discovery response to MNO-NRF 100A. In step 9, MNO-NRF 100A forwards the NF discovery response to consumer NF 200.

Upon receiving the NF discovery response, consumer NF 200 performs NF selection among the NF profiles received in the NF discovery response. In step 10, consumer NF 200 initiates an SBI request directed to producer NF 202 and forwards the SBI request to MNO-SCP 101A. In step 11, MNO-SCP 101A sends the SBI request to MVNO-SCP 101B. In step 12, MVNO-SCP 101B validates the SBI request be performing a lookup in NF-discovery-linked security database 400 using the NF instance Id of consumer NF 200 obtained from the SBI request message. If MVNO-SCP 101B locates a database record with a matching consumer NF instance Id, MVNO-SCP 101B checks the consumer PLMN Id. If the matching record includes a consumer PLMN Id that matches the consumer PLMN Id determined from the SBI request message, MVNO-SCP 101B determines whether the record includes a producer NF instance Id that matches the target producer NF instance Id from the SBI request message. If MVNO-SCP 101B determines that the database record includes a producer NF instance Id that matches the target NF instance Id from the message, MVNO-SCP 101B determines that the message passes the NF-discovery-linked security screening, and, in step 13, MVNO-SCP 101B sends the SBI request to producer NF 202. Producer NF 202 generates an SBI response and, in step 14, producer NF 202 forwards the SBI response to MVNO-SCP 101B. In step 15, MVNO-SCP 101B forwards the SBI response to MNO-SCP 101A. In step 16, MNO-SCP 101A forwards the SBI response to consumer NF 200.

Figure 10:
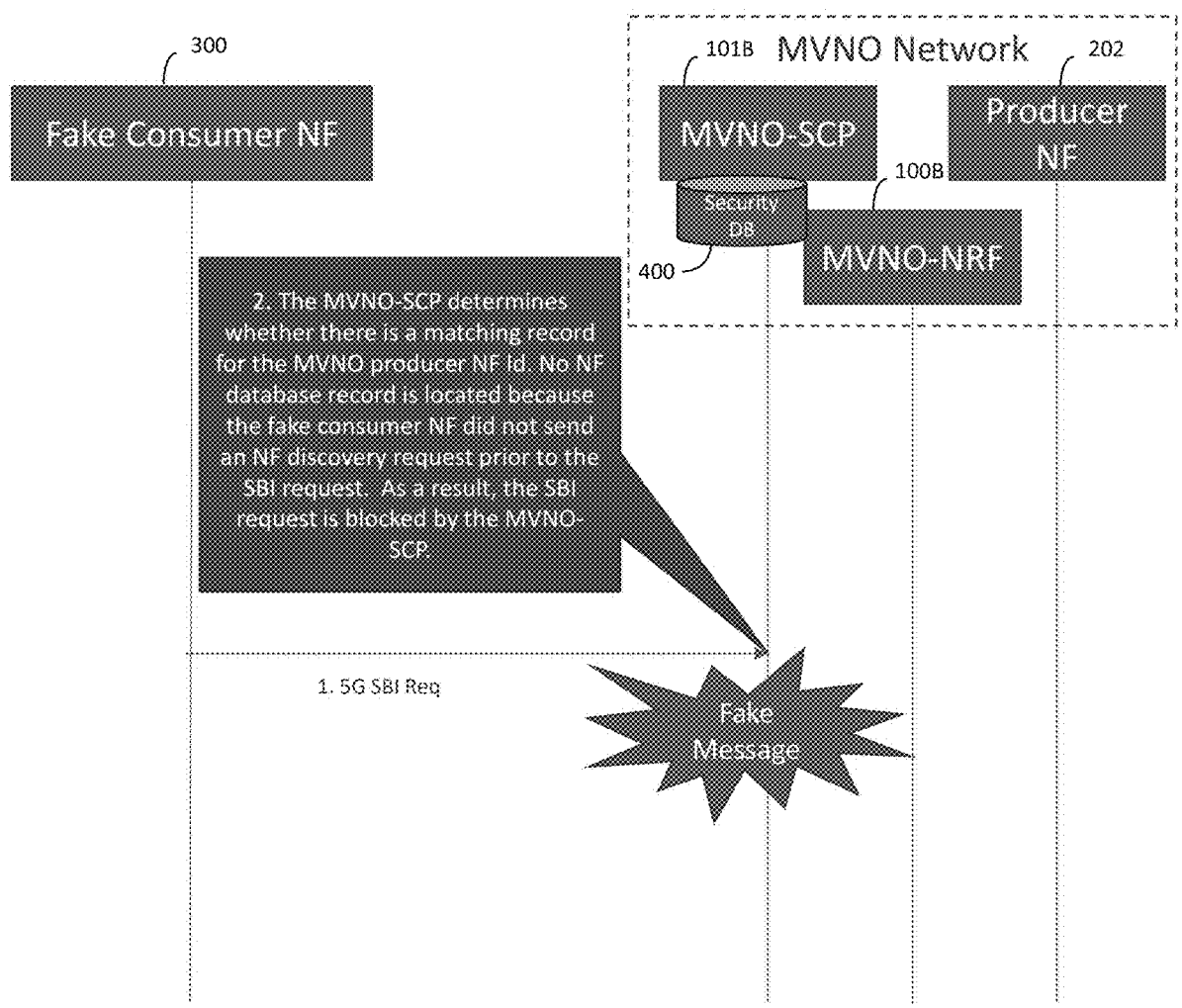
FIG. 10 is a message flow diagram illustrating the use of NF discovery results by an SCP to screen an SBI request message where the message fails NF-discovery-linked security screening.

FIG. 10 is a message flow diagram illustrating the use of NF discovery results by an MVNO-SCP to screen an SBI request message where the message fails NF-discovery-linked security screening. Referring to FIG. 10, in step 1, fake consumer NF 300 sends a fake SBI request message to a home network. In step 2, MVNO-SCP 101B receives the fake SBI request message and performs NF-discovery-linked security screening for the message. In this case, MVNO-SCP 101B does not locate a matching record in NF-discovery-linked security database 400. Accordingly, MVNO-SCP 101B performs a network security action, such as blocking the fake SBI request message.

Figure 11:
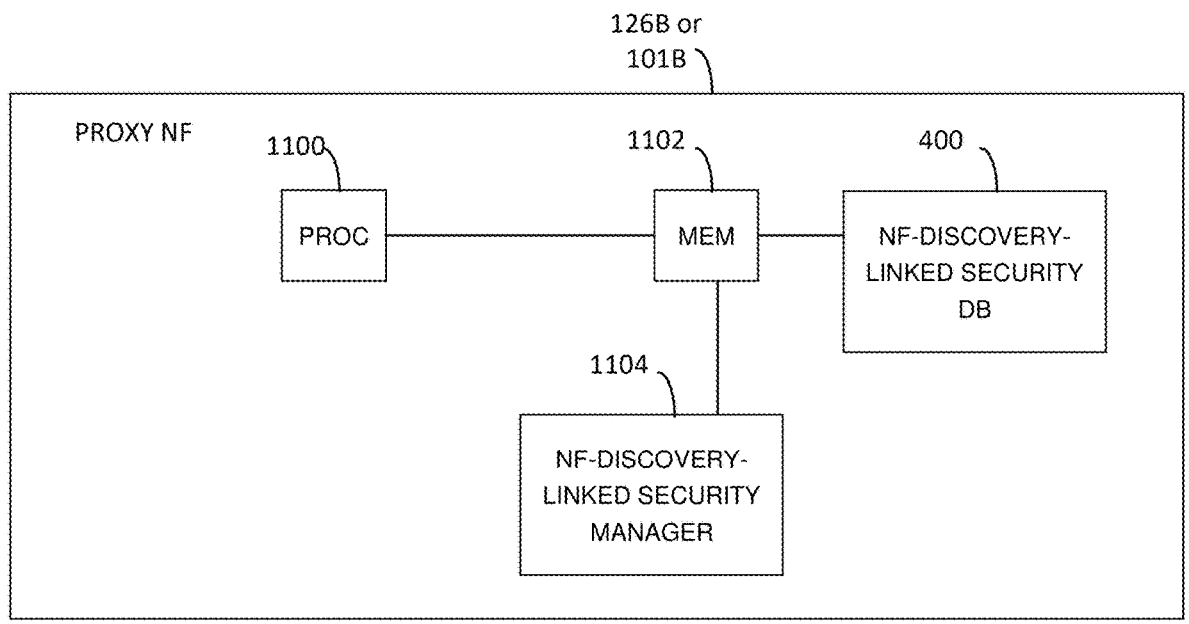
FIG. 11 is a block diagram illustrating an exemplary architecture for a proxy NF, such as a SEPP or an SCP, for performing NF-discovery-linked security screening.

FIG. 11 is a block diagram illustrating an exemplary architecture for a proxy NF, such as a SEPP or an SCP, for performing NF-discovery-linked security screening. Referring to FIG. 11, proxy NF 126B or 101B may be a SEPP or an SCP configured to perform NF-discovery-linked security screening. Proxy NF 126B or 101B includes at least one processor 1100 and memory 1102. Proxy NF 126B or 101B also includes NF-discovery-linked security database 400 and an NF-discovery-linked security manager 1104. NF-discovery-linked security manager 1104 creates records in NF-discovery-linked security database 400 based on successful NF discovery messages that are forwarded by proxy NF 126B or 101B. NF-discovery-linked security manager 1104 also uses the records in NF-discovery-linked security database 400 to screen SBI request messages received by proxy NF 126B or 101B. NF-discovery-linked security manager 1104 may be implemented using computer-executable instructions stored in memory 1102 and executed by processor 1100.

Figure 12:
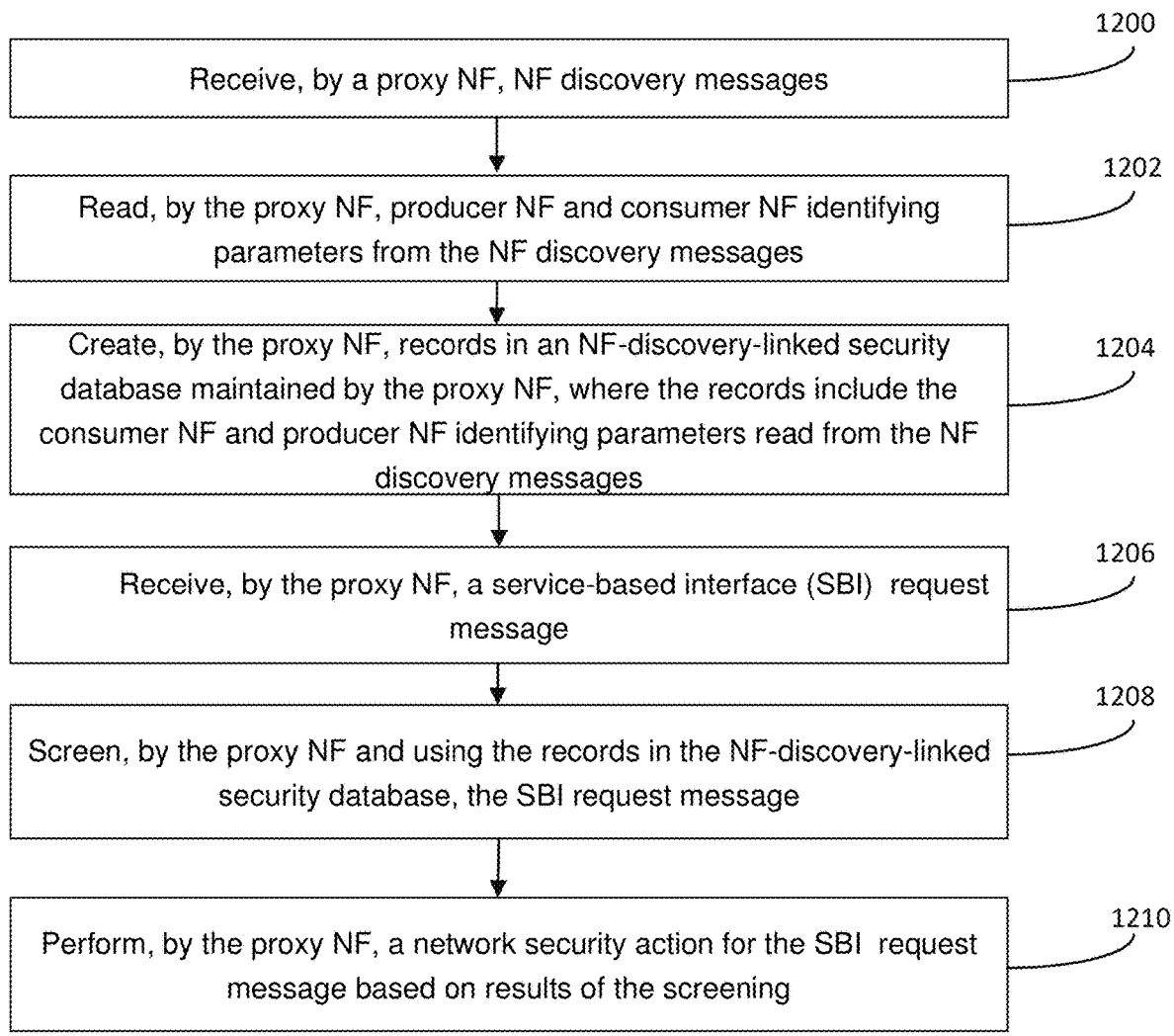
FIG. 12 is a flow chart illustrating an exemplary process performed by a proxy NF for NF-discovery-linked security screening.

FIG. 12 is a flow chart illustrating an exemplary process performed by a proxy NF for NF-discovery-linked security screening. Referring to FIG. 12, in step 1200, the process includes receiving, by a proxy NF, NF discovery messages. For example, a proxy NF, such as proxy NF 126B or 101B, may receive NF discovery request and response messages transmitted between an NF discovery service consumer and an NRF. If the proxy NF is a SEPP, the NF discovery messages may be inter-PLMN NF discovery messages. If the proxy NF is an SCP, the NF discovery messages may be messages transmitted between an MNO network and an MVNO network.

In step 1202, the process further includes reading, by the proxy NF, consumer-NF-identifying parameters and producer NF-identifying parameters from the NF discovery messages. For example, a proxy NF, such as proxy NF 126B or 101B, may obtain the consumer NF instance Id and consumer PLMN or MNO network Id from NF discovery request messages. The proxy NF may read producer NF instance Ids and producer NF service instance Ids from NF discovery results in NF discovery response messages. If the proxy NF is an SCP, consumer NF instance Ids can be read from CCA headers of the NF discovery request messages. If the proxy NF is a SEPP, consumer NF instance Ids and network Ids can be obtained from the N-32 context between the proxy NF and the remote SEPP. The requester PLMN Id can also be read from the requester-plmn-list information element (IE) in the NF discovery request. The producer NF instance Ids can be obtained from the search results of the NF discovery response. The search results may include an array of NF profiles and NF service profiles that match the query parameters from the NF discovery request. The NF instance Ids and NF service instance Ids can be read from the NF profiles and service profiles.

In step 1204, the process further includes creating, by the proxy NF, records in an NF-discovery-linked security database maintained by the proxy NF, where the records include the consumer-NF-identifying parameters and the producer-NF-identifying parameters read from the NF discovery messages. For example, a proxy NF, such as proxy NF 126B or 101B, may, for each successful NF discovery operation, create a record in NF-discovery-linked security database that includes the parameters read from the NF discovery messages in step 1202. Table 1 shown below illustrates and example of parameters that may be included in an NF-discovery-linked database record for an inter-PLMN proxy NF deployment at an SEPP.

TABLE 1

Example NF-Discovery-Linked Security Database Record for Inter-PLMN Proxy NF

| Consumer NF Instance Id | Consumer Network Id | Discovered Producer NF Instance Ids |
|---|---|---|
| VPLMN_Consumer_NF_Inst_Id_1 | PLMN_1 | HPLMN_Producer_NF_Inst_Id_1, HPLMN_Producer_NF_Inst_Id_2 ... HPLMN_Producer NF_Inst_Id_N |

In the example in Table 1, the NF-discovery-linked database record includes a consumer NF instance Id, a consumer network Id, and N discovered producer NF instance Ids. This record would be obtained by a SEPP, such as H-SEPP 126B, that protects the border between a home PLMN and a visited PLMN.

Table 2 shown below illustrates exemplary NF-discovery-linked security database parameters that may be created by a proxy NF located at the border between an MNO network and an MVNO network.

TABLE 2

Example NF-Discovery-Linked Security Database Record for Inter-PLMN Proxy NF

| Consumer NF Instance Id | Consumer Network Id | Discovered Producer NF Instance Ids |
|---|---|---|
| MNO_Consumer_NF_Inst_Id_1 | MNO_1 | MVNO_Producer_NF_Inst_Id_1, MVNO_Producer_NF_Inst_Id_2 ... MVNO_Producer NF_Inst_Id_N |

In the example in Table 2, the NF-discovery-linked database record includes a consumer NF instance Id, a consumer network Id, and N discovered producer NF instance Ids. This record would be obtained by an SCP, such as MVNO-SCP 101B, that routes messages an MVO and an MVNO.

In step 1206, the process further includes receiving, by the proxy NF, a service-based interface (SBI) service request message. For example, a proxy NF, such as proxy NF 126B or 101B, may receive an SBI request message, such as a request for policy service sent from an AMF to a CHF in a different network.

In step 1208, the process further includes screening, by the proxy NF and using the records in the NF-discovery-linked security database, the SBI request message. For example, a proxy NF, such as proxy NF 126B or 101B, may perform a lookup in the NF-discovery-linked security database 400 using consumer-NF-identifying parameters and producer-NF-identifying parameters from the SBI request message. The consumer-NF-identifying parameters may be the consumer NF instance Id and the consumer network Id read from one or more IEs in the message that carry these attributes. For example, the consumer NF network Id can be read from a 3gpp-Sbi-Originating-Network-Id header of the SBI request message. The consumer-NF-identifying parameters may also be read from the CCA headers of messages that include such headers. The producer-NF-identifying parameters can be read from the 3GPP-Sbi-Target-apiRoot headers of the SBI request messages.

In step 1210, the process further includes performing, by the proxy NF, a network security action for the SBI request message based on results of the screening. For example, a proxy NF, such as proxy NF 126B or 101B, may block the SBI request message if the message fails the NF-discovery-linked security screening or forward the SBI request message to its intended destination if the message passes the NF-discovery-linked security screening.

Exemplary advantages of the subject matter described herein include enhanced security between a VPLMN and an HPLMN and between an MNO network and an MVNO network. By performing NF-discovery-linked security screening at the boundary between the networks, network resources and data are maximally protected.

The disclosure of each of the following references is hereby incorporated herein by reference in its entirety.

REFERENCES 1. 3<sup>rd</sup> Generation Partnership Project; Technical Specification Group Core Network and Terminals; 5G System; Network Function Repository Services; Stage 3 (Release 18) 3GPP TS 29.510 V18.6.0 (2024-03)
2. 3<sup>rd</sup> Generation Partnership Project; Technical Specification Group Core Network and Terminals; 5G System; Technical Realization of Service Based Architecture; Stage 3 (Release 18) 3GPP TS 29.500 V18.5.0 (2024-03)
3. 3<sup>rd</sup> Generation Partnership Project; Technical Specification Group Services and System Aspects; Security architecture and procedures for 5G system (Release 18) 3GPP TS 33.501 V18.5.0 (2024-03)

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for mitigating network security attacks by linking network function (NF) discovery results to subsequent messages, the method comprising:
   receiving, at a proxy NF, NF discovery messages;
   reading, by the proxy NF, consumer-NF-identifying parameters and producer-NF-identifying parameters from the NF discovery messages, wherein reading, by the proxy NF, consumer-NF-identifying parameters and producer-NF-identifying parameters from the NF discovery messages includes reading a consumer NF instance Id from an NF discovery request message and at least one producer NF instance Id from discovery results in an NF discovery response message;
   creating, by the proxy NF, records in an NF-discovery-linked security database maintained by the proxy NF, wherein the records include the consumer-NF-identifying parameters and the producer-NF-identifying parameters read from the NF discovery messages;
   receiving, by the proxy NF, a service-based interface (SBI) request message;
   screening, by the proxy NF and using the records in the NF-discovery-linked security database, the SBI request message; and
   performing, by the proxy NF, a network security action for the SBI request message based on results of the screening.

2. The method of claim 1 wherein the proxy NF comprises a security edge protection proxy (SEPP).

3. The method of claim 2 wherein receiving the NF discovery messages includes receiving inter-public land mobile network (PLMN) NF discovery messages.

4. The method of claim 1 wherein the proxy NF comprises a service communication proxy (SCP).

5. The method of claim 4 wherein receiving the NF discovery messages are transmitted between a mobile network operator (MNO) network and a mobile virtual network operator (MVNO) network.

6. The method of claim 1 wherein creating the records includes creating a record that contains the consumer NF instance Id and the at least one producer NF instance Id.

7. The method of claim 1 wherein screening the SBI request message includes:
   reading, from the SBI request message, a consumer-NF-identifying parameter and a producer-NF-identifying parameter; and
   determining whether the NF-discovery-linked security database includes a record that contains the consumer-NF-identifying parameter and the producer-NF-identifying parameter read from the SBI request message.

8. The method of claim 7 wherein performing the network security action includes, when the NF-discovery-linked security database includes a record that contains the consumer-NF-identifying parameter and the producer-NF-identifying parameter read from the SBI request message, forwarding the SBI request message to a producer NF.

9. The method of claim 7 wherein performing the network security action includes, when the NF-discovery-linked security database does not include a record that contains the consumer-NF-identifying parameter and the producer-NF-identifying parameter read from the SBI request message, blocking the SBI request message.

10. A system for mitigating network security attacks by linking network function (NF) discovery results to subsequent messages, the system comprising:
    a proxy NF including at least one processor and a memory; and
    an NF-discovery-linked security manager executable by the at least one processor for receiving NF discovery messages,
    reading consumer-NF-identifying parameters and producer-NF-identifying parameters from the NF discovery messages,
    creating records in an NF-discovery-linked security database stored in the memory, wherein the records include the consumer-NF-identifying parameters and the producer-NF-identifying parameters read from the NF discovery messages, the NF-discovery-linked security manager for receiving a service-based interface (SBI) request message, screening, using the records in the NF-discovery-linked security database, the SBI request message,
    and performing a network security action for the SBI request message based on results of the screening, wherein the consumer-NF-identifying parameters include a consumer NF instance Id read from an NF discovery request message and at least one producer NF instance Id read from NF discovery results in an NF discovery response message and the records include a record that contains the consumer NF instance Id and the at least one producer NF instance Id.

11. The system of claim 10 wherein the proxy NF comprises a security edge protection proxy (SEPP).

12. The system of claim 11 wherein the NF discovery messages comprise inter-public land mobile network (PLMN) NF discovery messages.

13. The system of claim 10 wherein the proxy NF comprises a service communication proxy (SCP).

14. The system of claim 13 wherein the NF discovery messages are transmitted between a mobile network operator (MNO) network and a mobile virtual network operator (MVNO) network.

15. The system of claim 10 wherein, in screening the SBI request message, the NF-discovery-linked security manager is configured to:
    read, from the SBI request message, a consumer-NF-identifying parameter and a producer-NF-identifying parameter; and
    determine whether the NF-discovery-linked security database includes a record that contains the consumer-NF-identifying parameter and the producer-NF-identifying parameter in the SBI request message.

16. The system of claim 15 wherein, in performing the network security action, the NF-discovery-linked security manager is configured to, when the NF-discovery-linked security database includes a record that contains the consumer-NF-identifying parameter and the producer-NF-identifying parameter read from the SBI request message, forward the SBI request message to a producer NF.

17. The system of claim 15 wherein, in performing the network security action, the NF-discovery-linked security manager is configured to, when the NF-discovery-linked security database does not include a record that contains the consumer-NF-identifying parameter and the producer-NF-identifying parameter read from the SBI request message, block the SBI request message.

18. A non-transitory computer readable medium having stored thereon executable instructions that when executed by a processor of a computer control the computer to perform steps comprising:

receiving, at a proxy network function (NF), NF discovery messages;

reading, by the proxy NF, producer NF and consumer-NF-identifying parameters from the NF discovery messages, wherein reading, by the proxy NF, consumer-NF-identifying parameters and producer-NF-identifying parameters from the NF discovery messages includes reading a consumer NF instance Id from an NF discovery request message and at least one producer NF instance Id from discovery results in an NF discovery response message;

creating, by the proxy NF, records in an NF-discovery-linked security database maintained by the proxy NF, wherein the records include the consumer NF and producer-NF-identifying parameters read from the NF discovery messages;

receiving, by the proxy NF, a service-based interface (SBI) request message;

screening, by the proxy NF and using the records in the NF-discovery-linked security database, the SBI request message; and performing, by the proxy NF, a network security action for the SBI request message based on results of the screening.

\* \* \* \* \*